United States Patent
Tsuda

(10) Patent No.: US 11,483,764 B2
(45) Date of Patent: Oct. 25, 2022

(54) WIRELESS COMMUNICATION DEVICE AND WIRELESS COMMUNICATION SYSTEM

(71) Applicant: SONY CORPORATION, Tokyo (JP)

(72) Inventor: Shinichiro Tsuda, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/057,281

(22) PCT Filed: Apr. 16, 2019

(86) PCT No.: PCT/JP2019/016244
§ 371 (c)(1),
(2) Date: Nov. 20, 2020

(87) PCT Pub. No.: WO2019/230227
PCT Pub. Date: Dec. 5, 2019

(65) Prior Publication Data
US 2021/0368432 A1    Nov. 25, 2021

(30) Foreign Application Priority Data
May 28, 2018    (JP) .............................. JP2018-101159

(51) Int. Cl.
*H04W 48/18*    (2009.01)
*H04W 76/20*    (2018.01)
*H04W 84/04*    (2009.01)

(52) U.S. Cl.
CPC ........... *H04W 48/18* (2013.01); *H04W 76/20* (2018.02); *H04W 84/042* (2013.01)

(58) Field of Classification Search
CPC ............ H04W 4/023; H04W 56/0015; H04W 72/0453; G01S 5/0221; G01S 5/06; H04L 5/0048
See application file for complete search history.

(56) References Cited

U.S. PATENT DOCUMENTS

2017/0188241 A1* 6/2017 Mueck ................ H04W 72/082
2017/0318470 A1* 11/2017 Srikanteswara ...... H04W 16/14
(Continued)

OTHER PUBLICATIONS

"MulteFire Alliance MulteFire Deployment Scenarios and Requirements (Release 1)", MFA TR MF.101, V1.0.2, MulteFire Alliance, Feb. 2017, pp. 4, 10.

(Continued)

*Primary Examiner* — Joshua L Schwartz
(74) *Attorney, Agent, or Firm* — Chip Law Group

(57) ABSTRACT

Selection of a connection system is facilitated in MulteFire that simultaneously supports two types of modes, which are a PLMN access mode and an NHN access mode. A first wireless base station operates in a licensed frequency band and connects to a first network. A second wireless base station operates in an unlicensed frequency band and selects and connects to any of the first network and a second network. A wireless communication unit of a wireless communication device can communicate with each of the first and second wireless base stations. A connection-destination control unit notifies the second wireless base station to connect to the second network with priority over the first network within a range of the second wireless base station.

17 Claims, 7 Drawing Sheets

(56) References Cited

U.S. PATENT DOCUMENTS

2019/0115950 A1* 4/2019 Kakinada .............. H04W 76/15
2019/0124665 A1* 4/2019 Singh ................... H04W 16/04

OTHER PUBLICATIONS

"MulteFire Alliance Architecture for Neutral Host Network Access Mode Stage 2 (Release 1)", MFA TS MF.202, V1.0.4, MulteFire Alliance, Sep. 2017, pp. 5, 58, 59.

"MulteFire Alliance Technical Specification Group Radio Access Network; Evolved Universal Terrestrial Radio Access (E-UTRA); Radio Resource Control (RRC); Protocol specification (Release 1.0)", MFA TS 36.331, V1.0.3, MulteFire Alliance, Dec. 2017, pp. 50, 56, 57, 124-126.

"MulteFire Alliance; Technical Specification Group Radio Access Network; Evolved Universal Terrestrial Radio Access (E-UTRA); User Equipment (UE) Procedures in idle mode Release 1", MF TS 36.304, V1.0.1, MulteFire Alliance, May 2017, pp. 13, 14.

Gyorgy Wolfner, "MulteFire End-to-End Architecture and Neutral Host", Multefire, URL: https://www.multefire.org/wp-content/uploads/2016/10/MulteFire_E2E-Architecture.pdf, May 28, 2018, 21 Pages.

International Search Report and Written Opinion of PCT Application No. PCT/JP2019/016244, dated Jul. 9, 2019, 09 pages of ISRWO.

* cited by examiner

WIRELESS COMMUNICATION DEVICE AND WIRELESS COMMUNICATION SYSTEM

CROSS REFERENCE TO RELATED APPLICATIONS

This application is a U.S. National Phase of International Patent Application No. PCT/JP2019/016244 filed on Apr. 16, 2019, which claims priority benefit of Japanese Patent Application No. JP 2018-101159 filed in the Japan Patent Office on May 28, 2018. Each of the above-referenced applications is hereby incorporated herein by reference in its entirety.

TECHNICAL FIELD

The present technology relates to a wireless communication device. More specifically, the present technology relates to a wireless communication device having a plurality of operation modes, and a wireless communication system including the wireless communication device.

BACKGROUND ART

A wireless communication device that uses a wireless communication method compliant with a 3GPP standard generally operates at a licensed frequency. By making a contract with a telecommunications carrier that provides a wireless communication service using a licensed frequency, it becomes possible to receive the contracted wireless communication service via a card called a universal subscriber identity module (USIM). A public land mobile network (PLMN) is assigned to a telecommunications carrier that provides a wireless communication service. A user can specify an available wireless communication service (network) by the PLMN assigned to each contracted telecommunications carrier.

The wireless communication device selects a PLMN to which registration processing is performed, prior to cell selection. A PLMN Identity (PLMN-ID) includes a 3-digit mobile country code (MCC) and a 2-digit or 3-digit mobile network code (MNC), and has a 24-bit length. A list of networks that should be treated as a Home PLMN (HPLMN) is stored in the USIM. Furthermore, since the PLMN is broadcast from a base station via system information block 1 (SIB1), the wireless communication device can know the PLMN to which the base station belongs. Therefore, the wireless communication device can identify the base station belonging to the HPLMN via the USIM and system information (SI).

Furthermore, in order to popularize a system capable of operating long term evolution (LTE), which is a 4G standard, at an unlicensed frequency, a MulteFire alliance has been established. MulteFire has two types of operation modes, which are a PLMN access mode and a neutral host network (NHN) access mode, and can simultaneously support both operation modes (for example, see Non Patent Document 1). As represented by conventional smartphones, in addition to cellular services, in order to use a wireless LAN service installed indoors with poor cellular coverage and a free wireless LAN service installed at home or in a commercial facility, it is necessary to install two communication modules, the cellular and the wireless LAN. Whereas, by replacing the wireless LAN with MulteFire (for example, the NHN access mode), there is a possibility that one communication module can support similar use cases, and cost reduction and miniaturization can be expected.

CITATION LIST

Non Patent Document

Non Patent Document 1: Gyorgy Wolfner, "MulteFire End-to-End Architecture and Neutral Host", [May 20, 2018 search], Internet <URL:https://www.multefire.org/wp-content/uploads/2016/10/MulteFire_E2E-Architecture.pdf>

SUMMARY OF THE INVENTION

Problems to be Solved by the Invention

Wireless LAN is widely used not only for home use but also as a solution for interpolating indoor areas where cellular radio waves are hard to reach, such as stores. Whereas, it has become difficult to provide wireless LAN services for a fee because an image of being available for free has been established. Therefore, it is an actual situation that a store where the wireless LAN is installed bears various costs for maintaining a backhaul line in a promotional position.

Furthermore, a femto cell and a small cell compliant with the 3GPP wireless standard are expected as a solution for interpolating indoor areas where cellular radio waves are hard to reach, but they have not spread as expected due to complexity of installation site negotiations and interference control.

In such a situation, it is conceivable that the telecommunications carrier partially uses, in the PLMN access mode, MulteFire that operates in the NHN access mode. In a case where a user uses this MulteFire that operates in the PLMN access mode, there is a possibility that data transmitted and received using an unlicensed frequency may also be charged, and the user may not always realize the effect of replacing the current wireless LAN. Therefore, for users who expect use cases similar to those when using wireless LAN for free, a mechanism is desired in which the user who uses the wireless communication device takes the initiative to make a selection, in a connection method to MulteFire that simultaneously supports two types of modes, the PLMN access mode and the NHN access mode.

The present technology has been made in view of such a situation, and an object thereof is to facilitate selection of a connection system in MulteFire that simultaneously supports two types of modes, the PLMN access mode and the NHN access mode.

Solutions to Problems

The present technology has been made to solve the problems described above, and a first aspect thereof is a wireless communication device and a wireless communication system. The wireless communication device includes: a wireless communication unit capable of communicating with each of a first wireless base station configured to operate in a licensed frequency band and connect to a first network, and a second wireless base station configured to operate in an unlicensed frequency band and select and connect to any of the above-described first network and a second network; and a connection-destination control unit configured to notify the above-described second wireless base station to connect to the above-described second network with priority over the above-described first network within a range of the above-described second wireless base station. Therefore, an effect is provided that the second network is connected with priority over the first network within a range of the second wireless base station.

Furthermore, in this first aspect, the above-described second wireless base station may be a MulteFire access point, and has at least two operation modes, which are a PLMN access mode to connect to the above-described first network and an NHN access mode to connect to the above-described second network, and the above-described connection-destination control unit may notify the above-described second wireless base station to establish a connection in the above-described NHN access mode with priority over the above-described PLMN access mode within a range of the above-described second wireless base station. Therefore, an effect is provided that the NHN access mode is operated with priority over the PLMN access mode within a range of the second wireless base station.

Furthermore, in this first aspect, the above-described NHN access mode may be used by a provider different from a provider using the above-described PLMN access mode. Therefore, an effect is provided that the NHN access mode is operated with priority by a provider different from the provider using the PLMN access mode.

Furthermore, in this first aspect, the above-described wireless communication unit may transmit, via the above-described PLMN access mode, a paging message containing the same device identifier as a device identifier included in a paging message transmitted via the above-described first wireless base station. Therefore, an effect is provided that a paging message is transmitted via the second wireless base station.

Furthermore, in this first aspect, there may be further included a system information acquisition unit configured to acquire system information regarding the above-described second wireless base station. Therefore, an effect is provided that system information is acquired on the basis of a signal transmitted from the second wireless base station.

Furthermore, in this first aspect, the above-described system information acquisition unit may acquire, as the above-described system information, information indicating whether or not there is the above-described second network connectable from the above-described second wireless base station. Therefore, an effect is provided that the presence or absence of the second network connectable from the second wireless base station is grasped.

Furthermore, in this first aspect, the above-described system information acquisition unit may acquire a list of PLMN identification information regarding the above-described second wireless base station as the above-described system information, in a case where the above-described connection-destination control unit does not instruct the above-described second wireless base station to connect to the above-described second network with priority over the above-described first network. Therefore, an effect is provided that a list of PLMN identification information is obtained.

Furthermore, in this first aspect, the above-described system information acquisition unit may acquire a list of PSP identification information regarding the above-described second wireless base station as the above-described system information, in a case where the above-described connection-destination control unit notifies the above-described second wireless base station to connect to the above-described second network with priority over the above-described first network. Therefore, an effect is provided that a list of PSP identification information is obtained.

Furthermore, in this first aspect, there may be further included a connection-destination selection setting unit configured to display a name of a PSP corresponding to the above-described PSP identification information on the basis of the above-described list of PSP identification information, to prompt selection of a PSP, and the above-described wireless communication unit may notify the above-described second wireless base station to establish a connection for the above-described selected PSP. Therefore, an effect is provided that a connection for the selected PSP is established.

Furthermore, in this first aspect, in a state of an idle mode or an inactive mode, the above-described wireless communication unit may acquire, via the above-described system information, a parameter for cell selection/reselection, intra-frequency neighboring cell information, inter-frequency neighboring cell information, and a black cell list, and may acquire NHN identification information corresponding to the above-described second wireless base station included in the above-described black cell list. Therefore, an effect is provided that the NHN identification information is acquired on the basis of the acquired black cell list.

Furthermore, in this first aspect, in a state of the above-described idle mode or the above-described inactive mode, the above-described wireless communication unit may acquire NHN identification information corresponding to the above-described second wireless base station included in a second black cell list held in advance. Therefore, an effect is provided that the NHN identification information is acquired on the basis of the second black cell list held in advance.

Furthermore, in this first aspect, the above-described wireless communication unit may acquire the above-described second black cell list via the Internet and hold. Therefore, an effect is provided that the second black cell list is acquired via the Internet and held.

Furthermore, in this first aspect, the above-described wireless communication unit may acquire and hold the above-described second black cell list via a proximity communication. Therefore, an effect is provided that the second black cell list is acquired via a proximity communication and held.

Furthermore, in this first aspect, the above-described wireless communication unit may hold, as the above-described second black cell list, NHN identification information related to the above-described second wireless base station connected in the past, and/or PSP identification information of the above-described second wireless base station. Therefore, an effect is provided that the PSP identification information is held as the second black cell list.

Furthermore, in this first aspect, the above-described wireless communication unit may hold, as the above-described second black cell list, the NHN identification information and/or the PSP identification information of the above-described second wireless base station together with information regarding a location. Therefore, an effect is provided that information regarding a location is also held as the second black cell list.

Furthermore, in this first aspect, in a case where the above-described connection-destination control unit notifies the above-described second wireless base station to establish a connection in the above-described NHN access mode with priority over the above-described PLMN access mode at a time of connecting to the above-described second wireless base station, the above-described wireless communication unit may camp on in the above-described PLMN access mode in a state of an idle mode or an inactive mode, check at least a paging message in a fixed or variable cycle, and execute a process required for a connection in the above-described NHN access mode prior to a process for transitioning to a connection mode. Therefore, an effect is provided that, in the idle mode or the like, the process required for a connection in the NHN access mode is executed prior to the process for transitioning to the connection mode.

Furthermore, in this first aspect, when having transitioned from the above-described connection mode to the above-described idle mode or the above-described inactive mode, the above-described wireless communication unit may switch a camp-on destination from the above-described NHN access mode to the above-described PLMN access mode. Therefore, an effect is provided that the camp-on destination is switched from the NHN access mode to the PLMN access mode when transition is made from the connection mode to the idle mode or the like.

Effects of the Invention

According to the present technology, in MulteFire that simultaneously supports two types of modes, the PLMN access mode and the NHN access mode, an excellent effect is provided that selection of a connection system can be facilitated. Note that the effects described herein are not necessarily limited, and any of the effects described in the present disclosure is possible.

MODE FOR CARRYING OUT THE INVENTION

Hereinafter, an embodiment for implementing the present technology (hereinafter, referred to as an embodiment) will be described. The description will be made in the following order.

1. Embodiment
2. Modified Example

1. Embodiment

[Wireless Communication System]

Figure 1:
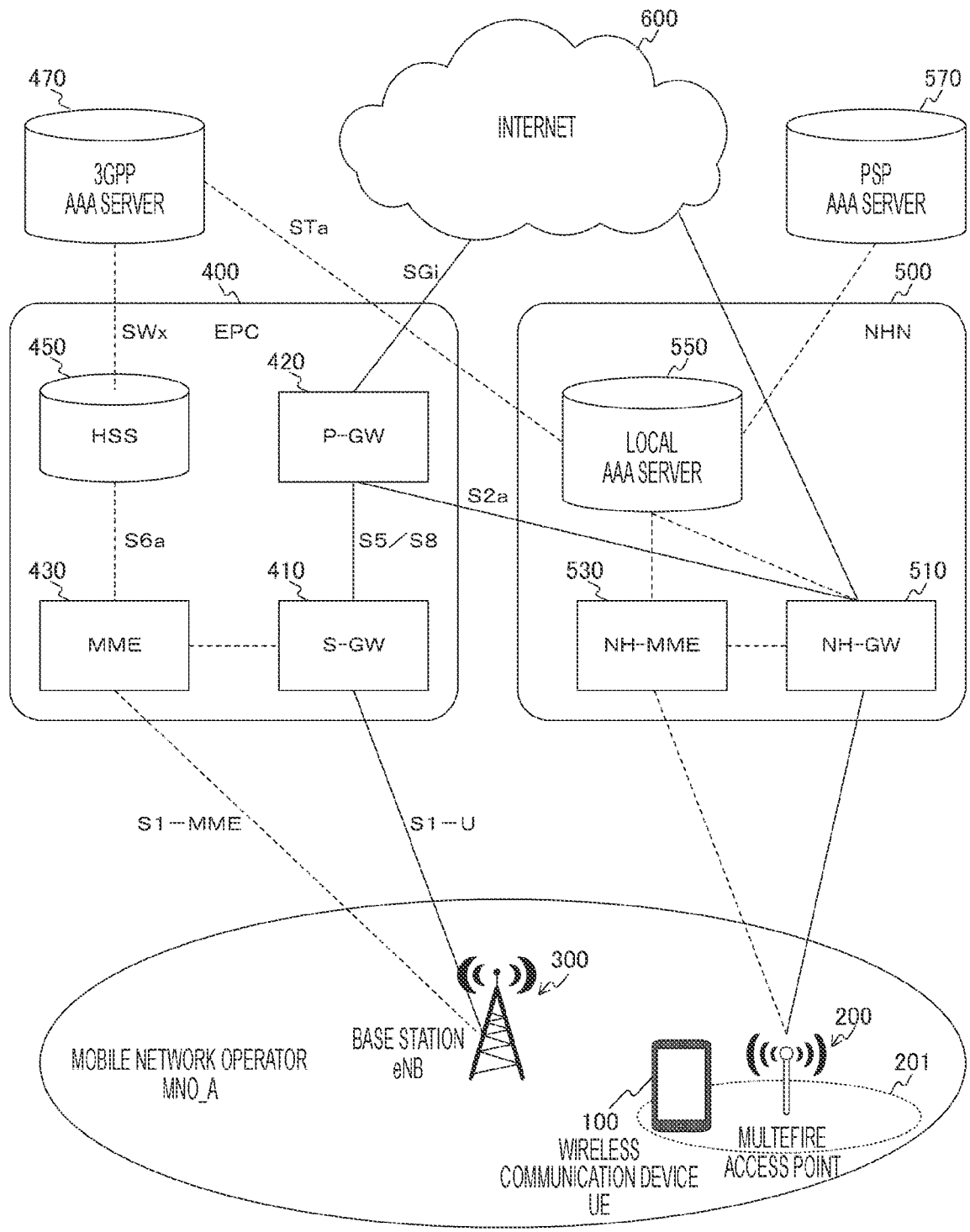
FIG. 1 is a diagram illustrating an example of an overall configuration of a wireless communication system according to an embodiment of the present technology.

FIG. 1 is a diagram illustrating an example of an overall configuration of a wireless communication system according to an embodiment of the present technology.

In this wireless communication system, a mobile network operator MNO_A provides a wireless communication service using a licensed frequency band via a base station eNodeB (eNB) 300. Here, the wireless communication service is, for example, a universal mobile telecommunications system (UMTS), which is the third-generation system compliant with 3GPP, long term evolution (LTE)/LTE-advanced (LTE-A), which are the fourth-generation system, enhanced LTE (eLTE), which is an extended standard of LTE and complements the fifth-generation system, or the fifth generation system. Although one base station eNB 300 is shown in this example, a plurality of base stations is generally arranged in order to provide wide coverage. Note that the base station eNB 300 is an example of a first wireless base station described in the claims.

A wireless communication device user equipment (UE) 100 having a subscription contract for using the wireless communication service of the mobile network operator MNO_A can use a call service and a data communication service via the Internet, via the base station eNB 300 and an evolved packet core (EPC) 400 operated by the mobile network operator MNO_A. Here, the mobile network operator MNO_A operates the EPC 400 and the base station eNB 300 as network nodes belonging to a unique PLMN.

The EPC 400 includes a serving gateway (S-GW) 410, a packet data network gateway (P-GW) 420, a mobility management entity (MME) 430, and a home subscriber server (HSS) 450. Note that the EPC 400 is an example of a first network described in the claims.

The S-GW 410 is a gateway that relays user packet data. This S-GW 410 is connected to the base station eNB 300 via an interface S1-U.

The P-GW 420 is a gateway that connects to a network such as Internet 600. This P-GW 420 is connected to the S-GW 410 via an interface S5/S8. Furthermore, this P-GW 420 is connected to the Internet 600 via an interface SGi.

The MME 430 is for performing establishment and releasing of a connection, authentication of the wireless communication device UE 100 in cooperation with the HSS 450, and the like. This MME 430 is connected to the base station eNB 300 via an interface S1-MME.

The HSS 450 is a server that manages contractor information. The HSS 450 is connected to the MME 430 via an interface S6a.

Furthermore, to the EPC 400, a 3GPP authentication, authorization and accounting (AAA) server 470 is connected. This 3GPP AAA server 470 is a server for performing authentication, authorization, and accounting of a 3GPP contractor. This 3GPP AAA server 470 is connected to the HSS 450 via an interface SWx.

Furthermore, in this wireless communication system, in addition to the EPC 400 operated by the mobile network operator MNO_A, a neutral host network (NHN) 500 of MulteFire is installed. Providers that perform MulteFire services using this NHN 500 are called participating service providers (PSPs). To the PSP, a PSP-ID serving as identification information is assigned. However, the 3GPP PLMN can also be a PSP using USIM-based connection authentication.

Furthermore, in this wireless communication system, a MulteFire access point 200 is provided. The MulteFire access point 200 is an access point for a MulteFire system. Note that the MulteFire access point 200 is an example of a second wireless base station described in the claims.

This MulteFire access point 200 can operate simultaneously in two types of operation modes, which are a PLMN access mode and an NHN access mode. The PLMN access mode is a mode for performing communication by connecting to the EPC 400. The NHN access mode is a mode for performing communication by connecting to the NHN 500. Note that the NHN access mode is used by a provider PSP different from the mobile network operator MNO_A using the PLMN access mode.

The NHN 500 includes a neutral host gateway (NH-GW) 510, a neutral host mobility management entity (NH-MME) 530, and a local AAA server 550. Note that the NHN 500 is an example of a second network described in the claims.

The NH-GW 510 is a gateway that connects to a network such as the Internet 600. This NH-GW 510 is connected to the P-GW 420 via an interface S2a.

The NH-MME 530 is for establishment and releasing of a connection in the NHN 500, authentication of the wireless communication device UE 100 cooperating with the local AAA server 550, and the like.

The local AAA server 550 is a local AAA server on the NHN 500. This local AAA server 550 is connected to the 3GPP AAA server 470 via an interface STa.

Furthermore, to the NHN 500, a PSP AAA server 570 is connected. Any PSP connects its own PSP AAA server 570 to the local AAA server 550, which is to be a proxy for the NHN 500. Therefore, the PSP can use the NHN 500 and the MulteFire access point 200 as network nodes belonging to its own PSP-ID.

Note that, since this PSP AAA server 570 is provided for every PSP, there is a case where a plurality of PSP AAA servers 570 is connected to one NHN 500. Furthermore, the NHN 500 can be virtualized by network functions virtualization (NFV).

Whereas, the mobile network operator MNO_A connects its own 3GPP AAA server 470 to the local AAA server 550, which is to be a proxy for the NHN 500, and connects the P-GW 420 of the EPC 400 to the NH-GW 510 of the NHN 500. Therefore, it is possible to use the NHN 500 and the MulteFire access point 200 as network nodes belonging to its own PLMN-ID.

That is, the provider PSP that provide the MulteFire service and the mobile network operator MNO_A can simultaneously provide each wireless communication service via one MulteFire access point 200.

Here, the mobile network operator MNO_A can use the local AAA server 550 connected to its own 3GPP AAA server 470 as a proxy server, to authenticate the wireless communication device UE 100 with SIM-based authentication. At that time, via the 3GPP AAA server 470, the local AAA server 550 can acquire authorization data required for authentication of the wireless communication device UE 100 from the HSS 450 of the EPC 400. That is, this operation is an equivalent operation to the PLMN access mode for the wireless communication device UE 100 having a subscription contract for using the wireless communication service of the mobile network operator MNO_A.

Moreover, the mobile network operator MNO_A can transmit, via the PLMN access mode of the MulteFire access point 200, a paging message including the same device identifier as a device identifier (UE Identity) included in a paging message transmitted via the base station eNB 300. Here, the device identifier may be, for example, SAE temporary mobile subscriber identity (S-TMSI) or international mobile subscriber identity (IMSI).

Note that the configuration example in the figure is one form of a configuration example in which the MulteFire access point 200 is operated simultaneously in two types of operation modes, the PLMN access mode and the NHN access mode, and it is needless to say that the configuration is not limited to this. Furthermore, it is needless to say that, in the configuration of the NHN 500, the expression "PLMN access mode" used in the present specification also widely includes home location register (HLR)/home subscriber server (HSS) or a policy and charging rules function (PCRF) managed or operated by a telecommunications carrier assigned with an ID of the PLMN, or a method of authentication, authorization, and accounting with SIM-based authentication via an AAA server compliant with the 3GPP specification.

Next, a case is assumed in which the wireless communication device UE 100 having a subscription contract for using the wireless communication service of the mobile network operator MNO_A moves from out of a range into the range of a service range 201 of the MulteFire access point 200. For the wireless communication device UE 100, the NHN 500 and the MulteFire access point 200 operate as network nodes belonging to the PLMN-ID of the mobile network operator MNO_A. Therefore, the wireless communication device UE 100 can receive an IP communication service of the mobile network operator MNO_A via the MulteFire access point 200.

Therefore, while seamless communication services can be received, there is a possibility that a communication service provided via the MulteFire access point 200 operating in an unlicensed frequency band may also be charged. In that case, for example, there is a possibility that the service will not be equivalent to the wireless LAN service currently provided for free in some cafes and the like.

Note that, in order to operate the MulteFire access point 200 as a network node belonging to the PLMN-ID of the mobile network operator MNO_A, that is, to operate in the PLMN access mode, it is also possible to connect the MulteFire access point 200 directly to the EPC 400.

Furthermore, information regarding the PLMN-ID to which the MulteFire access point 200 belongs can be acquired via system information block type MF1 broadcast from the MulteFire access point 200. Here, the system information block type MF1 is one of system information blocks (SIBs) for MulteFire. This system information block type MF1 includes all essential elements included in system information block type 1 and system information block type 2 for wireless communication systems compliant with 3GPP. Furthermore, discrimination between a base station or a cell compliant with normal 3GPP and a MulteFire access point can be determined by an operating frequency and the presence or absence of an MF primary synchronization signal (MF-PSS) and an MF secondary synchronization signal (MF-SSS).

Figure 2:
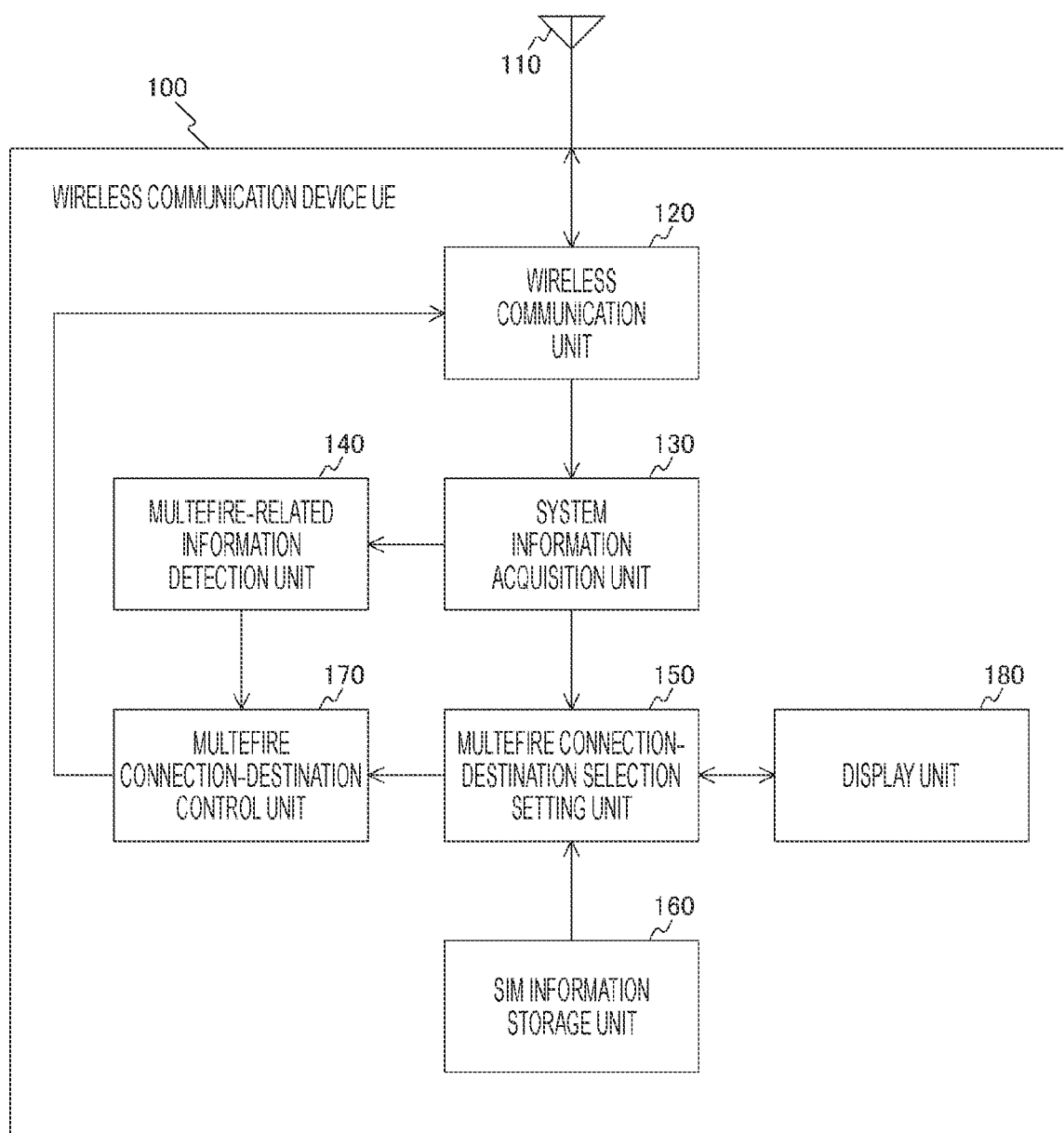
FIG. 2 is a diagram illustrating an example of a configuration of a wireless communication device UE 100 according to the embodiment of the present technology.

FIG. 2 is a diagram illustrating an example of a configuration of the wireless communication device UE 100 according to the embodiment of the present technology.

This wireless communication device UE 100 includes an antenna 110, a wireless communication unit 120, a system information acquisition unit 130, a MulteFire-related information detection unit 140, a MulteFire connection-destination selection setting unit 150, a SIM information storage unit 160, a MulteFire connection-destination control unit 170, and a display unit 180. This wireless communication device UE 100 receives a signal from the base station eNB 300 or the MulteFire access point 200 via the antenna 110 and the wireless communication unit 120, and transmits the signal to the base station eNB 300 or the MulteFire access point 200.

The system information acquisition unit 130 acquires system information transmitted from the base station eNB 300 or the MulteFire access point 200.

The MulteFire-related information detection unit 140 acquires information (for example, an NHN-ID, a PSP-ID, and the like) related to MulteFire from the system information acquired by the system information acquisition unit 130.

The MulteFire connection-destination selection setting unit 150 displays, on the display unit 180, for example, a PLMN that is a candidate for a connection destination acquired from the SIM information storage unit 160 or a provider name corresponding to the PLMN, or displays a PSP-ID acquired from the information related to MulteFire and a service provider name corresponding to the PSP-ID, and sets a candidate for the PLMN or the PSP that is to be the connection destination. Note that the MulteFire connection-destination selection setting unit 150 is an example of a connection-destination selection setting unit described in the claims.

The MulteFire connection-destination control unit 170 performs control required to connect to the specified PSP on the basis of the acquired information related to MulteFire and the PSP set as the connection destination candidate. Note that the MulteFire connection-destination control unit 170 is an example of a connection-destination control unit described in the claims.

Note that, in addition to LTE/LTE-A, standards supported by MulteFire in an unlicensed frequency band may be eLTE, which is an extended standard of LTE and complements the fifth-generation system for which standardization work is currently performed with 3GPP, a fifth generation system, or any standard that will be standardized in the future.

Figure 3A:
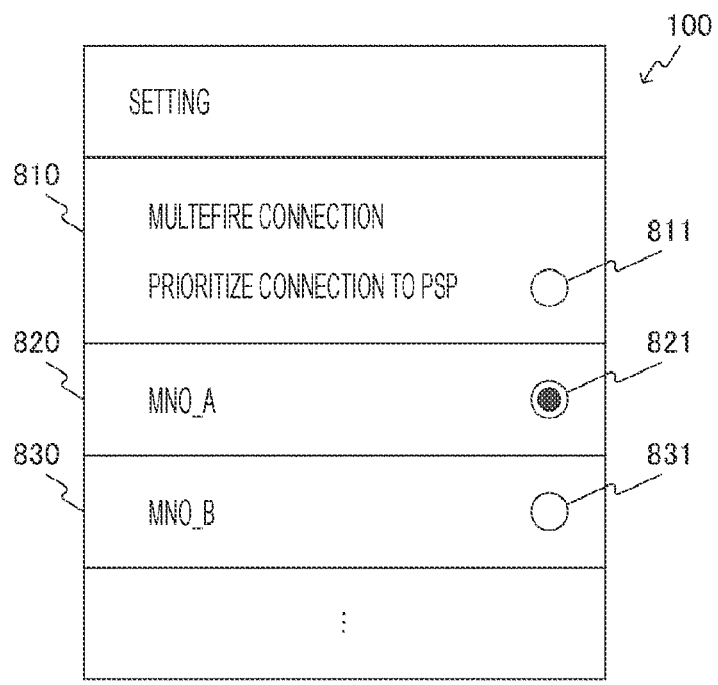
FIGS. 3A and 3B are views illustrating an example of a setting screen displayed on a display unit 180 of the wireless communication device UE 100 according to the embodiment of the present technology.
Figure 3B:
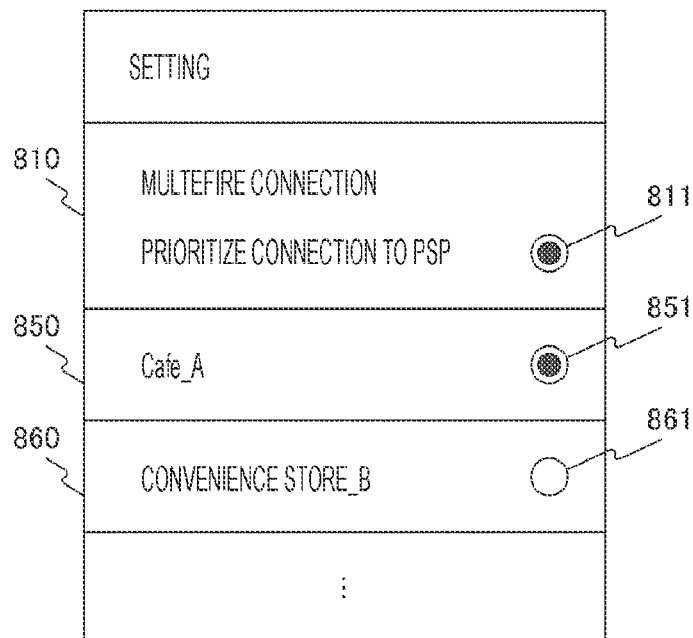

FIGS. 3A and 3B are views illustrating an example of a setting screen displayed on the display unit 180 of the wireless communication device UE 100 according to the embodiment of the present technology. This setting screen is displayed, for example, when the wireless communication device UE 100 moves from out of a range into the range of the service range 201 of the MulteFire access point 200.

The display of FIG. 3A is a display screen in a case where a user performs, on a display 810, a setting 811 that does not prioritize a connection to the PSP (that is, prioritizes a connection in the PLMN access mode over the NHN access mode) for the connection method of MulteFire.

At this time, the display screen displays a PLMN having a subscription contract or a provider name (for example, MNO_A) corresponding to the PLMN (820). The user selects a select button 821 in a case of selecting the PLMN or the provider.

In a case where the user has a roaming contract, a PLMN having the roaming contract or a provider name (for example, MNO_B) corresponding to the PLMN may be displayed (830). The user selects a select button 831 in a case of selecting the PLMN or the provider. Note that, for the PLMNs having the subscription and roaming contracts and the provider names corresponding to the PLMNs, information stored in a SIM is used.

Whereas, the display of FIG. 3B is a display screen in a case where the user performs, on the display 810, the setting 811 that prioritizes a connection to the PSP (that is, prioritizes a connection in the NHN access mode over the PLMN access mode) for the connection method of MulteFire.

At this time, the display screen displays a list of available PSP-IDs or service provider names corresponding to the PSP-IDs (850, 860). The user selects a corresponding select button 851 or 861 in the list.

For example, by making this setting, a user who expects a service equivalent to the wireless LAN service that is provided for free at some of the cafes (for example, Cafe_A) described above can use the NHN access mode with priority over the PLMN access mode. In other words, in a case where the PLMN access mode and the free NHN access mode services are provided via the MulteFire access point operated by the cafe, it is possible to receive a free IP communication service provided by Cafe_A as the PSP in the NHN access mode.

In a case of being out of a range of the service range 201 of the MulteFire access point 200, the list (850, 860) displayed here may display a PSP-ID or a service provider name corresponding to the PSP-ID on the basis of a history of past connections. Furthermore, the user may be allowed to manually add a desired PSP to the list.

Whereas, within the range of the service range 201 of the MulteFire access point 200, it is possible to display a PSP-ID that can be acquired via the system information block type MF1 that is broadcast from the MulteFire access point 200, or all service provider names (for example, Cafe_A, convenience store B) corresponding to the PSP-ID. Furthermore, the number of PSPs that can be selected in the list may be one or may be more.

[Operation]

Figure 4:
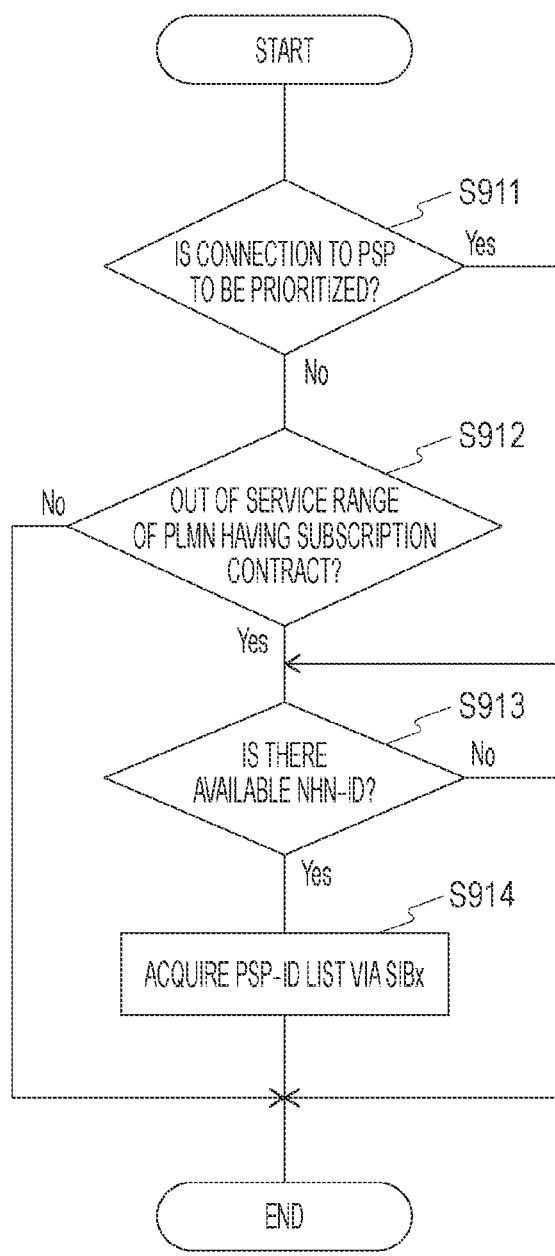
FIG. 4 is a flowchart showing a processing procedure example of a PSP-ID acquisition process of the wireless communication device UE 100 in the embodiment of the present technology.

FIG. 4 is a flowchart showing a processing procedure example of a PSP-ID acquisition process of the wireless communication device UE 100 in the embodiment of the present technology. The wireless communication device UE 100 acquires a PSP-ID from the MulteFire access point 200 operating in the NHN access mode by the following procedure.

When the process is started, it is determined whether or not a connection to the PSP is to be prioritized over the PLMN (step S911). In a case where the connection to the PSP is prioritized (step S911: Yes), it is determined whether or not there is an available NHN 500 (step S913). Here, in the determination of whether or not there is an available NHN 500, it may be determined that there is an available NHN 500 on the basis of a primary synchronization signal (PSS) and a secondary synchronization signal (SSS) transmitted from the MulteFire access point 200 operating in the NHN access mode, for example, in a process similar to acquiring a 3GPP cell ID. Furthermore, after synchronization using the MF-PSS and the MF-SSS, it may be determined that there is an available NHN 500 on the basis of an NHN-ID acquired via the system information block type MF1.

Here, in a case of setting to prioritize the connection to the PSP over the PLMN (step S911: Yes), cell selection/reselection is performed when the wireless communication device UE 100 is a radio resource control idle mode (RRC idle mode), or an RRC inactive mode. In this case, via system information transmitted from the base station eNB 300, the wireless communication device UE 100 acquires parameters for cell selection/reselection, and intra-frequency neighbouring cell information and inter-frequency neighbouring cell information as information about neighboring cells belonging to the same PLMN, and monitors (measures) a cell that is a neighboring cell candidate operating at the same frequency (intra-frequency) or a different frequency (inter-frequency). At this time, in addition to those candidate cells, a MulteFire access point that operates at a carrier frequency of each band of an unlicensed frequency band used by the MulteFire access point 200 may be monitored as a candidate cell. Here, the parameters for cell selection/reselection are acquired via system information block type 3 (SIB3), and include each parameter such as Qrxlevmin or Qqualmin required for calculating a cell selection/reselection index called S-criterion, or Qhyst required for cell ranking called R-criterion. Furthermore, the intra-frequency neighboring cell information is acquired via system information block type 4 (SIB4), and includes a cell ID (physical cell identity) of neighboring cell that operates at the same frequency, Qoffset used for calculating R-criterion, and the like. Moreover, the inter-frequency neighboring cell information is acquired via system information block type 5 (SIB5), and includes a cell ID of neighboring cell that operates at a different frequency, Qrxlevmin or Qqualmin required for calculating S-criterion, Qoffset used for calculating R-criterion, and the like.

Note that a carrier frequency, an NHN-ID, and a PSP-ID of each band of the unlicensed frequency band used by this MulteFire access point 200 may be included in a list called a black cell list.

Here, as long as the parameters for cell selection/reselection, the intra-frequency neighboring cell information, or the inter-frequency neighboring cell information is acquired via system information (for example, SIB3, SIB4, and SIB5) from the base station eNB 300 operated by the mobile network operator MNO_A, and the wireless communication device UE 100 uses the wireless communication service of the mobile network operator MNO_A, basically, it suffices to consider neighboring cell candidates that operate at the same frequency or different frequencies on the basis of the parameters for cell selection/reselection.

Whereas, the black cell list can also be acquired from the base station eNB 300 operated by the mobile network operator MNO_A via the system information (for example, SIB4 and SIB5). Here, as an example of utilizing the black cell list, for example, in a case where it is not desired to camp on a specific cell (for example, femto cell) depending on an RRC state (for example, in an RRC idle mode or an RRC inactive mode), by including such a specific cell in the black cell list, an operation is enabled in which the specific cell is not included in the neighboring cell candidate monitored by the wireless communication device UE 100.

Note that, in a case of setting to prioritize a connection to the PSP over the PLMN (step S911: Yes), in addition to a neighboring cell candidate that operates at the same frequency or different frequency, it is also possible to measure, as a neighboring cell candidate, a MulteFire access point that operates at a frequency included in the black cell list and a MulteFire access point belonging to a PSP-ID (or an NHN 500). Note that a measurement process of the MulteFire access point that operates at a frequency included in the black cell list and the MulteFire access point belonging to the PSP-ID (or the NHN 500) may be executed in a fixed or variable cycle (for example, a discontinuous reception (DRX) cycle).

Furthermore, the wireless communication device UE 100 may hold a list corresponding to the black cell list described above, in advance in an internal memory. For example, the list corresponding to the black cell list described above may be acquired via the Internet 600 and held in the wireless communication device UE 100. Furthermore, the list corresponding to the black cell list described above may be acquired via proximity communication means of device to device (D2D) communication or the like standardized by Bluetooth (registered trademark) or Rel-12, and be held in the wireless communication device UE 100.

Moreover, the wireless communication device UE 100 may hold the NHN-ID and/or the PSP-ID of the MulteFire access point 200 connected in the past, in the wireless communication device UE 100. Here, the wireless communication device UE 100 may hold location information together when holding the NHN-ID and/or the PSP-ID of the MulteFire access point 200. Note that this location information may be information regarding latitude, longitude, and altitude acquired via a global navigation satellite system (GNSS). Furthermore, this location information may be a tracking area code (TA code) or a cell ID to which the base station eNB 300 operated by the mobile network operator MNO_A belongs.

Next, in a case where there is an available NHN 500 (step S913: Yes), a PSP-ID list is acquired via the system information block type MF1 transmitted from the MulteFire access point 200 (step S914), and the process is ended.

Whereas, in a case where a connection to the PSP is not prioritized (step S911: No), it is determined whether or not to be out of a service range of a PLMN having a subscription contract (step S912). In a case of being out of the service range of the PLMN having the subscription contract (step S912: Yes), the processing from step S913 may be executed.

In a case of not being out of the service range of the PLMN having the subscription contract (that is, within the range) (step S912: No), the process is ended.

Note that, in some cases, for example, for the purpose of traffic offload, the mobile network operator MNO_A may use the MulteFire access point 200 operating in the NHN access mode as an access point that operates in the PLMN access mode. In that case, the NHN 500 may be used even in a case of not being out of the service range of the PLMN having the subscription contract (that is, within the range) (step S912: No). That is, in a case where there is an available NHN 500, a PLMN-ID included in the PSP-ID list may be acquired via the system information block type MF1.

Figure 5:
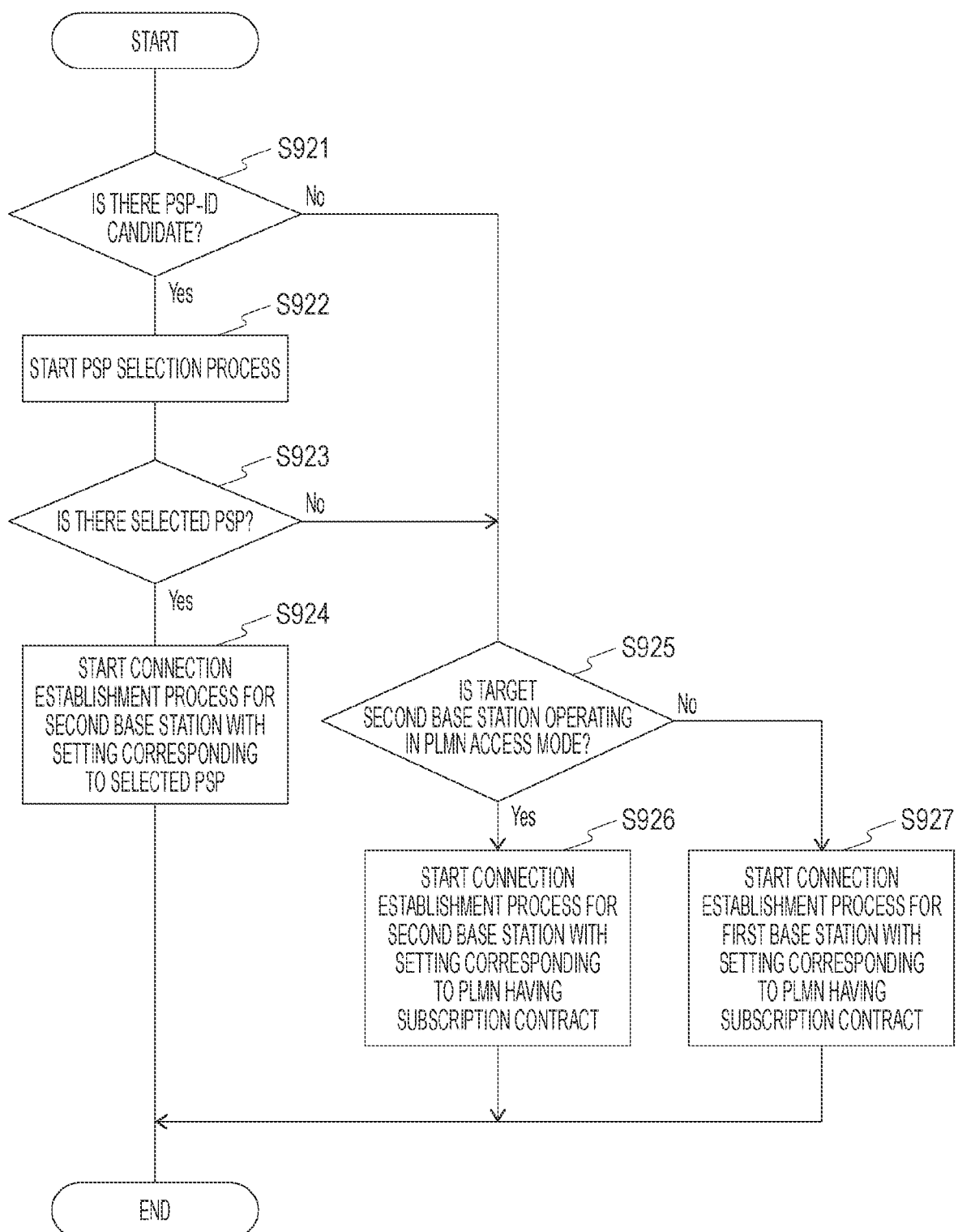
FIG. 5 is a flowchart showing a processing procedure example of a connection start process of the wireless communication device UE 100 according to the embodiment of the present technology.

FIG. 5 is a flowchart showing a processing procedure example of a connection start process of the wireless communication device UE 100 according to the embodiment of the present technology. This process may be executed subsequently to the PSP-ID acquisition process described above. For example, when a signal that triggers a communication start is received from an application, this connection process is started, and it is determined whether or not there is a PSP candidate of a connection destination on the basis of the PSP-ID (step S921).

When there is a PSP candidate (step S921: Yes), a process of selecting a PSP is started (step S922). Here, a method of selecting a PSP may be, for example, a method of displaying PSP candidates on a display screen and selecting one from the candidates. Furthermore, there may be used a method of registering in advance a PSP to be selected in the wireless communication device UE 100, or holding information regarding the PSP to be selected in the wireless communication device UE 100, and selecting the PSP in a case where the PSP or the information regarding the PSP is included in the PSP candidate. Here, the selection may be made automatically.

Subsequently, it is determined whether or not there is a selected PSP (step S923). Then, if there is a selected PSP (step S923: Yes), a connection establishment process is started for a second wireless base station (for example, the MulteFire access point 200) with setting corresponding to the PSP of the connection destination (step S924).

Whereas, if there is no selected PSP (step S923: No), subsequently, it is determined whether or not the target second wireless base station is operating in the PLMN access mode (step S925). If the second wireless base station is operating in the PLMN access mode (step S925: Yes), a connection establishment process is started for the second wireless base station with setting corresponding to the PLMN having the subscription contract (step S926).

If it is determined that the second wireless base station is not operating in the PLMN access mode (step S925: No), the connection establishment process is started for the first wireless base station with setting corresponding to the PLMN having the subscription contract (step S927).

Furthermore, if there is no PSP candidate (step S921: No), the processing from step S925 is executed.

Note that the connection start process described here is an example, and it is needless to say that the connection start process broadly includes a process of selecting a desired PSP from the PSP candidates of the connection destination by manual or automatic means, and starting the connection process with the selected PSP as the connection destination.

Figure 6:
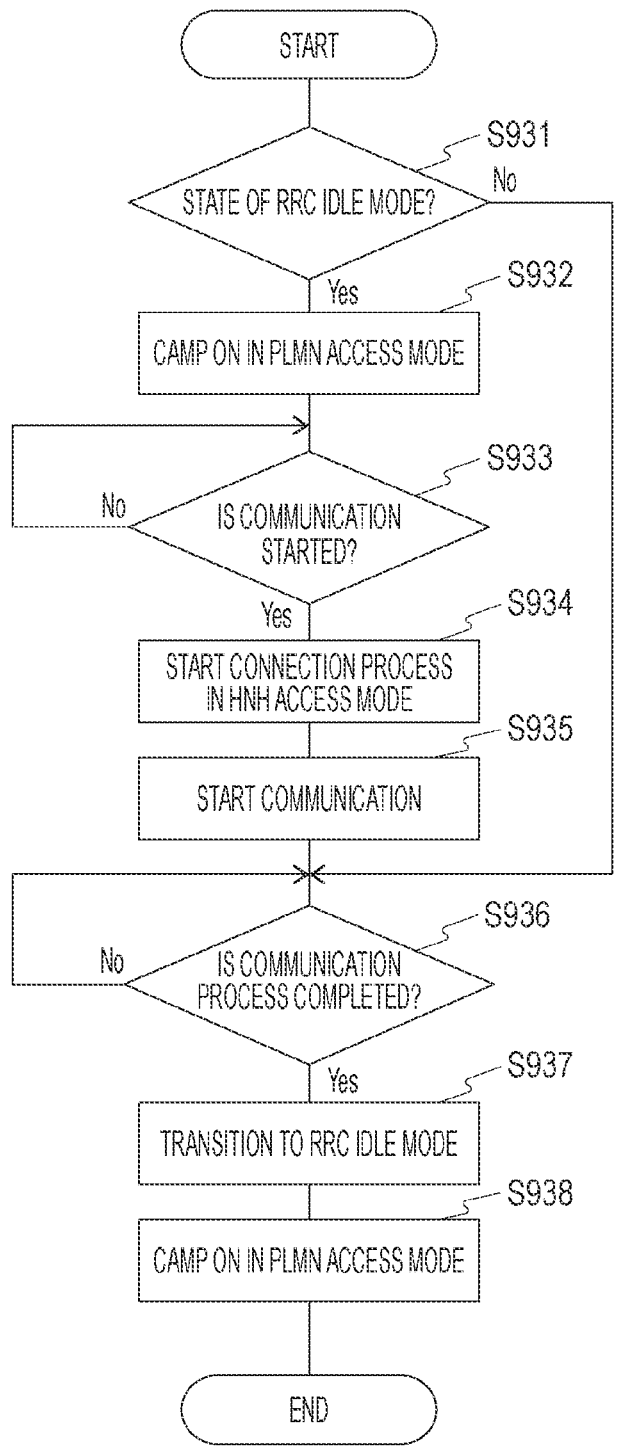
FIG. 6 is a flowchart showing another processing procedure example of the connection start process of the wireless communication device UE 100 according to the embodiment of the present technology.

FIG. 6 is a flowchart showing another processing procedure example of the connection start process of the wireless communication device UE 100 according to the embodiment of the present technology.

In a case where the wireless communication device UE 100 in the RRC idle mode or the RRC inactive mode has a subscription in the NHN access mode, or camps on a PSP other than the PLMN having the roaming contract, paging for incoming calls and the like cannot be received via the PLMN (for example, MNO_A).

Therefore, in accordance with the process shown in the figure, paging can be enabled via the PLMN during a period of the RRC idle mode or the RRC inactive mode even in the setting of prioritizing the connection to the PSP over the PLMN. That is, the base station eNB 300 or the MulteFire access point 200 operated by the mobile network operator MNO_A is camped on in the PLMN access mode. Then, when starting the communication, in order to transmit an RRC connection request message, the connection process to the desired PSP in the NHN access mode is executed prior to starting a connection establishment message sequence. For example, the process may be performed so as to connect to the desired PSP in the NHN access mode at a timing of transition to the RRC connected mode.

In this way, according to the embodiment of the present technology, a connection system can be easily selected in MulteFire that simultaneously supports two types of modes, the PLMN access mode and the NHN access mode. For example, at a time of entering a range of the service range 201 of the MulteFire access point 200, the NHN access mode can be connected with priority over the PLMN access mode in accordance with the setting.

2. Modified Example

Figure 7:
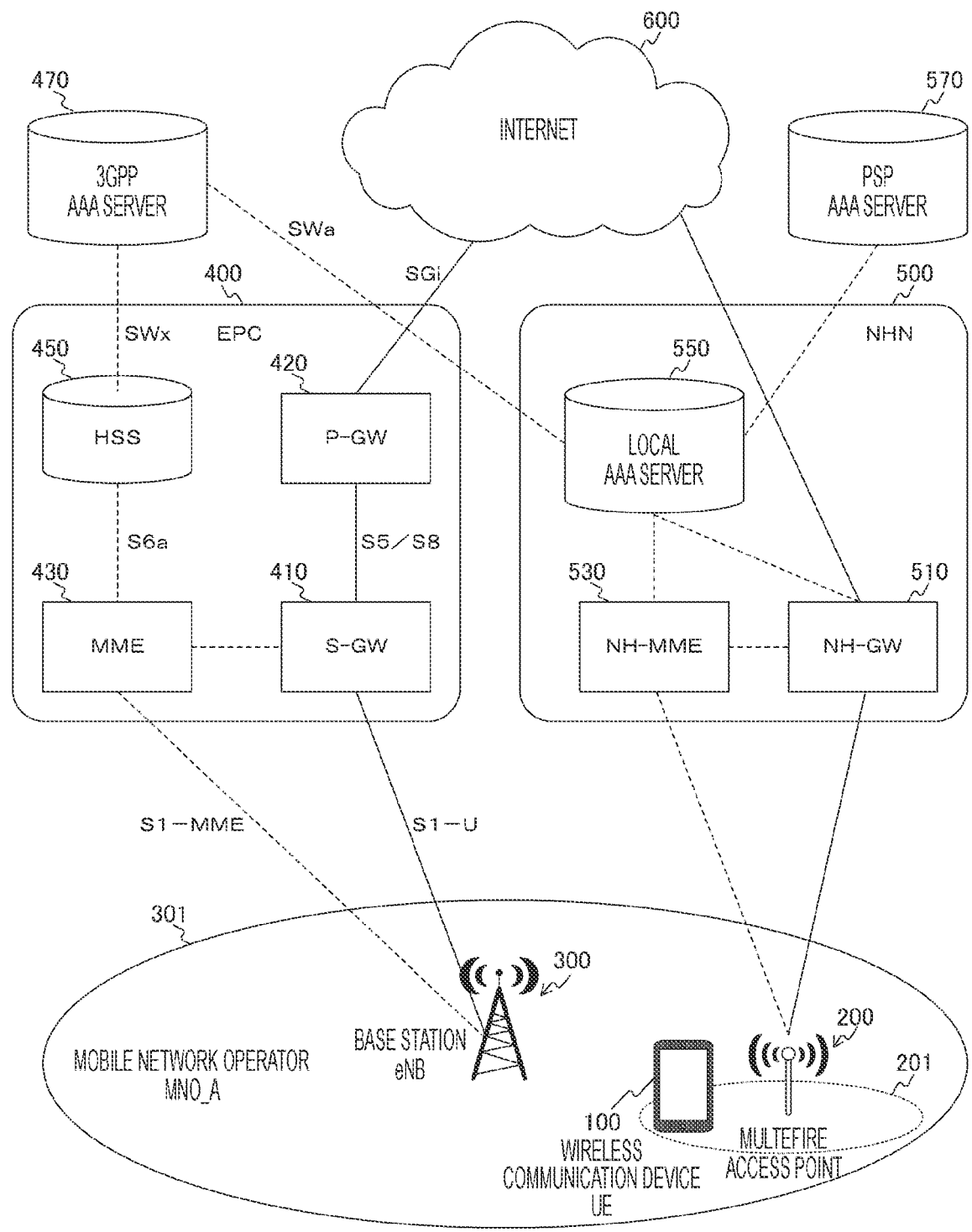
FIG. 7 is a diagram illustrating an example of an overall configuration of a wireless communication system according to a modified example of the embodiment of the present technology.

FIG. 7 is a diagram illustrating an example of an overall configuration of a wireless communication system according to a modified example of the embodiment of the present technology. The EPC 400 and the NHN 500 are connected by the interface S2a in the above-described embodiment, but it is also possible to operate the NHN 500 without making a direct connection between the two. In this modified example, an example of a case where an EPC 400 and an NHN 500 are configured without being directly connected will be described.

A mobile network operator MNO_A provides a wireless communication service using a licensed frequency band via a base station eNB 300. A PSP-ID, which is identification information, is assigned to a provider PSP that provides a MulteFire service, and any PSP can use the NHN 500 and a MulteFire access point 200 as network nodes belonging to its own PSP-ID, by connecting its own PSP AAA server 570 to a local AAA server 550, which is to be a proxy for the NHN 500.

Whereas, the mobile network operator MNO_A connects its own 3GPP AAA server 470 to the local AAA server 550, which is to be a proxy for the NHN 500, via an interface SWa. Therefore, it is possible to use the NHN 500 and the MulteFire access point 200 as network nodes belonging to its own PLMN-ID. That is, this operation is to be an equivalent operation to a PLMN access mode, for a wireless communication device UE 100 having a subscription contract for using a wireless communication service of the mobile network operator MNO_A.

Note that this configuration example is one form of another configuration example in which the MulteFire access point 200 is operated simultaneously in two types of operation modes, a PLMN access mode and an NHN access mode, and it is needless to say that the configuration is not limited to this.

Note that the embodiment described above is an example for embodying the present technology, and the matters in the embodiment and the matters used to specify the invention in the claims have a corresponding relationship. Similarly, the matters used to specify the invention in the claims and the matters in the embodiment of the present technology to which the same names are assigned have a corresponding relationship. However, the present technology is not limited to the embodiment, and can be embodied by applying various modifications to the embodiment without departing from the gist thereof.

Furthermore, the processing procedure described in the embodiment described above may be regarded as a method having a series of these procedures, and may be regarded as a program for causing a computer to execute the series of procedures, or a recording medium storing the program. As this recording medium, for example, a compact disc (CD), a MiniDisc (MD), a digital versatile disk (DVD), a memory card, a Blu-ray (registered trademark) disc, or the like can be used.

Note that the effects described in this specification are merely examples and are not limited, and additional effects may be present.

Note that the present technology can also have the following configurations.

(1) A wireless communication device including:

a wireless communication unit capable of communicating with each of a first wireless base station configured to operate in a licensed frequency band and connect to a first network, and a second wireless base station configured to operate in an unlicensed frequency band and select and connect to any of the first network and a second network; and a connection-destination control unit configured to notify the second wireless base station to connect to the second network with priority over the first network within a range of the second wireless base station.

(2) The wireless communication device according to (1) described above, in which the second wireless base station is a MulteFire access point, and has at least two operation modes that are a public land mobile network (PLMN) access mode to connect to the first network, and a neutral host network (NHN) access mode to connect to the second network, and the connection-destination control unit notifies the second wireless base station to establish a connection in the NHN access mode with priority over the PLMN access mode within a range of the second wireless base station.

(3) The wireless communication device according to (2) described above, in which the NHN access mode is used by a provider different from a provider that uses the PLMN access mode.

(4) The wireless communication device according to (2) described above, in which the wireless communication unit transmits, via the PLMN access mode, a paging message including the same device identifier as a device identifier included in a paging message transmitted via the first wireless base station.

(5) The wireless communication device according to any one of (1) to (4) described above, further including a system information acquisition unit configured to acquire system information regarding the second wireless base station.

(6) The wireless communication device according to (5) described above, in which the system information acquisition unit acquires, as the system information, information indicating whether or not there is the second network connectable from the second wireless base station.

(7) The wireless communication device according to (5) described above, in which in a case where the connection-destination control unit does not instruct the second wireless base station to connect to the second network with priority over the first network, the system information acquisition unit acquires a list of PLMN identification information regarding the second wireless base station as the system information.

(8) The wireless communication device according to (5) described above, in which in a case where the connection-destination control unit notifies the second wireless base station to connect to the second network with priority over the first network, the system information acquisition unit acquires a list of participating service providers (PSP) identification information regarding the second wireless base station as the system information.

(9) The wireless communication device according to (8) described above, further including a connection-destination selection setting unit configured to display a name of a PSP corresponding to the PSP identification information on the basis of the list of PSP identification information, to prompt selection of a PSP, in which the wireless communication unit notifies the second wireless base station to establish a connection for the selected PSP.

(10) The wireless communication device according to (5) described above, in which in a state of an idle mode or an inactive mode, the wireless communication unit acquires, via the system information, a parameter for cell selection/reselection, intra-frequency neighboring cell information, inter-frequency neighboring cell information, and a black cell list, and acquires NHN identification information corresponding to the second wireless base station included in the black cell list.

(11) The wireless communication device according to (10) described above, in which in a state of the idle mode or the inactive mode, the wireless communication unit acquires NHN identification information corresponding to the second wireless base station included in a second black cell list held in advance.

(12) The wireless communication device according to (11) described above, in which the wireless communication unit acquires the second black cell list via the Internet, and holds.

(13) The wireless communication device according to (11) described above, in which the wireless communication unit acquires the second black cell list via a near field communication, and holds.

(14) The wireless communication device according to (11) described above, in which the wireless communication unit holds, as the second black cell list, NHN identification information related to the second wireless base station connected in a past time, and/or PSP identification information of the second wireless base station.

(15) The wireless communication device according to (11) described above, in which the wireless communication unit holds, as the second black cell list, NHN identification information and/or PSP identification information of the second wireless base station together with information regarding a location.

(16) The wireless communication device according to any one of (2) to (4) described above, in which in a case where the connection-destination control unit notifies the second wireless base station to establish a connection in the NHN access mode with priority over the PLMN access mode at a time of connecting to the second wireless base station, the wireless communication unit camps on in the PLMN access mode in a state of an idle mode or an inactive mode, checks at least a paging message in a fixed or variable cycle, and executes a process required for a connection in the NHN access mode prior to a process for transitioning to a connection mode.

(17) The wireless communication device according to (16) described above, in which when having transitioned from the connection mode to the idle mode or the inactive mode, the wireless communication unit switches a camp-on destination from the NHN access mode to the PLMN access mode.

(18) A wireless communication system including:

a first wireless base station configured to operate in a licensed frequency band and connect to a first network;

a second wireless base station configured to operate in an unlicensed frequency band and select and connect to any of the first network and a second network; and a wireless communication device including a wireless communication unit capable of communicating with each of the first and second wireless base stations, and a connection-destination control unit configured to notify the second wireless base station to connect to the second network with priority over the first network within a range of the second wireless base station.

REFERENCE SIGNS LIST

100 Wireless communication device user equipment (UE)
110 Antenna
120 Wireless communication unit
130 System information acquisition unit
140 MulteFire-related information detection unit
150 MulteFire connection-destination selection setting unit 160 Subscriber identity module (SIM) information storage unit
170 MulteFire connection-destination control unit
180 Display unit
200 MulteFire access point
300 Base station eNodeB (eNB)
400 EPC (Evolved Packet Core)
410 S-GW (Serving Gateway)
420 Packet data network gateway (P-GW)
430 MME (Mobility Management Entity)
450 HSS (Home Subscriber Server)
470 3GPP authentication, authorization and accounting (AAA) server
500 NHN (Neutral Host Network)
510 NH-GW (Neutral Host Gateway)
530 NH-MME (Neutral Host Mobility Management Entity)
550 Local AAA server
570 Participating service providers (PSP) AAA server
600 Internet

The invention claimed is:

1. A wireless communication device, comprising:
a wireless communication unit configured to communicate with each of a first wireless base station and a second wireless base station, wherein
the first wireless base station operates in a licensed frequency band and connects to a first network,
the second wireless base station operates in an unlicensed frequency band, selects one of the first network or a second network, and connects to one of the first network or the second network,
the second wireless bases station is a Multefire access point,
the second wireless bases station has at least two operation modes, and
the at least two operation modes include a public land mobile network (PLMN) access mode to connect to the first network, and a neutral host network (NHN) access mode to connect to the second network; and
a connection-destination control unit configured to notify the second wireless base station to establish a connection in the NHN access mode with priority over the PLMN access mode within a range of the second wireless base station.

2. The wireless communication device according to claim 1, wherein the NHN access mode is associated with a provider different from a provider associated with the PLMN access mode.

3. The wireless communication device according to claim 1, wherein
the wireless communication unit is further configured to transmit, via the PLMN access mode, a paging message that includes a same device identifier as a device identifier included in a paging message transmitted via the first wireless base station.

4. The wireless communication device according to claim 1, further comprising a system information acquisition unit configured to acquire system information regarding the second wireless base station.

5. The wireless communication device according to claim 4, wherein
the system information acquisition unit is further configured to acquire, as the system information, information that indicates whether the second network is connectable from the second wireless base station.

6. The wireless communication device according to claim 4, wherein
the system information acquisition unit is further configured to acquire, based on the connection-destination control unit does not instruct the second wireless base station to connect to the second network with priority over the first network, a list of PLMN identification information regarding the second wireless base station as the system information.

7. The wireless communication device according to claim 4, wherein
the system information acquisition unit is further configured to acquire, based on the notification to the second wireless base station to connect to the second network with priority over the first network, a list of participating service providers (PSP) identification information regarding the second wireless base station as the system information.

8. The wireless communication device according to claim 7, further comprising
a connection-destination selection setting unit configured to display a name of a PSP corresponding to the PSP identification information based on the list of PSP identification information, to prompt selection of the PSP, wherein
the wireless communication unit is further configured to notify the second wireless base station to establish a connection for the selected PSP.

9. The wireless communication device according to claim 4, wherein
in a state of an idle mode or an inactive mode, the wireless communication unit is further configured to:
acquire, via the system information, a parameter for cell selection or reselection, intra-frequency neighboring cell information, inter-frequency neighboring cell information, and a first black cell list, and
acquire NHN identification information corresponding to the second wireless base station included in the first black cell list.

10. The wireless communication device according to claim 9, wherein
in a state of the idle mode or the inactive mode, the wireless communication unit is further configured to acquire NHN identification information corresponding to the second wireless base station included in a second black cell list held in advance.

11. The wireless communication device according to claim 10, wherein the wireless communication unit is further configured to:
acquire the second black cell list via Internet, and
hold the acquired second black cell list.

12. The wireless communication device according to claim 10, wherein the wireless communication unit is further configured to:
acquire the second black cell list via a near field communication, and
hold the acquired second black cell list.

13. The wireless communication device according to claim 10, wherein
the wireless communication unit is further configured to hold, as the second black cell list, NHN identification information related to the second wireless base station connected in a past time, and PSP identification information of the second wireless base station.

14. The wireless communication device according to claim 10, wherein the wireless communication unit is further configured to hold, as the second black cell list, NHN identification information and PSP identification information of the second wireless base station together with information associated with a location.

15. The wireless communication device according to claim 1, wherein
in a case of the notification to the second wireless base station to establish a connection in the NHN access mode with priority over the PLMN access mode at a time of connection to the second wireless base station, the wireless communication unit is configured to:
camp on in the PLMN access mode in a state of one of an idle mode or an inactive mode;
check at least a paging message in a fixed or variable cycle; and
execute a process for a connection in the NHN access mode prior to a process for transition to a connection mode.

16. The wireless communication device according to claim 15, wherein
the wireless communication unit is further configured to switch, based on transition from the connection mode to the idle mode, a camp-on destination from the NHN access mode to the PLMN access mode.

17. A wireless communication system, comprising:
a first wireless base station configured to;
operate in a licensed frequency band and
connect to a first network;
a second wireless base station configured to:
operate in an unlicensed frequency band;
select one of the first network or a second network, and
connect to one of the first network the second network, wherein
the second wireless bases station is a Multefire access point,
the second wireless bases station has at least two operation modes, and
the at least two operation modes include a public land mobile network (PLMN) access mode to connect to the first network, and a neutral host network (NHN) access mode to connect to the second network; and
a wireless communication device including:
a wireless communication unit configured to communicate with each of the first wireless base station and the second wireless base station, and
a connection-destination control unit configured to notify the second wireless base station to establish a connection in the NHN access mode with priority over the PLMN access mode within a range of the second wireless base station.

* * * * *